United States Patent [19]

Bauch et al.

[11] Patent Number: 5,018,916
[45] Date of Patent: May 28, 1991

[54] ACTUATING ARRANGEMENT FOR A TOOL OR WORKPIECE CLAMPING DEVICE IN A MACHINE TOOL SPINDLE

[75] Inventors: Karl Bauch, Kempten; Alfred Raff, Marktoberdorf; Helmut Heel, Lengenwang; Norbert Leege, Betzigau, all of Fed. Rep. of Germany

[73] Assignee: Ott Maschinentechnik GmbH, Kempten, Fed. Rep. of Germany

[21] Appl. No.: 571,320

[22] Filed: Aug. 22, 1990

[30] Foreign Application Priority Data

Oct. 30, 1989 [DE] Fed. Rep. of Germany ....... 3936121

[51] Int. Cl.$^5$ .............. B23B 31/10; B23C 5/26
[52] U.S. Cl. ..................... 409/233; 74/110; 279/4; 408/239 R
[58] Field of Search .......... 409/233; 408/239, 239 A, 408/240; 74/110; 279/4

[56] References Cited

U.S. PATENT DOCUMENTS

| | | | |
|---|---|---|---|
| 4,068,559 | 1/1978 | Schmid, Jr. et al. | 409/233 |
| 4,347,753 | 9/1982 | Claussen et al. | 74/110 |
| 4,411,568 | 10/1983 | Röhm | 409/233 |

FOREIGN PATENT DOCUMENTS 3801509  7/1989  Fed. Rep. of Germany ...... 409/233

*Primary Examiner*—Z. R. Bilinsky
*Attorney, Agent, or Firm*—Flynn, Thiel, Boutell & Tanis

[57] ABSTRACT

Figure 1:
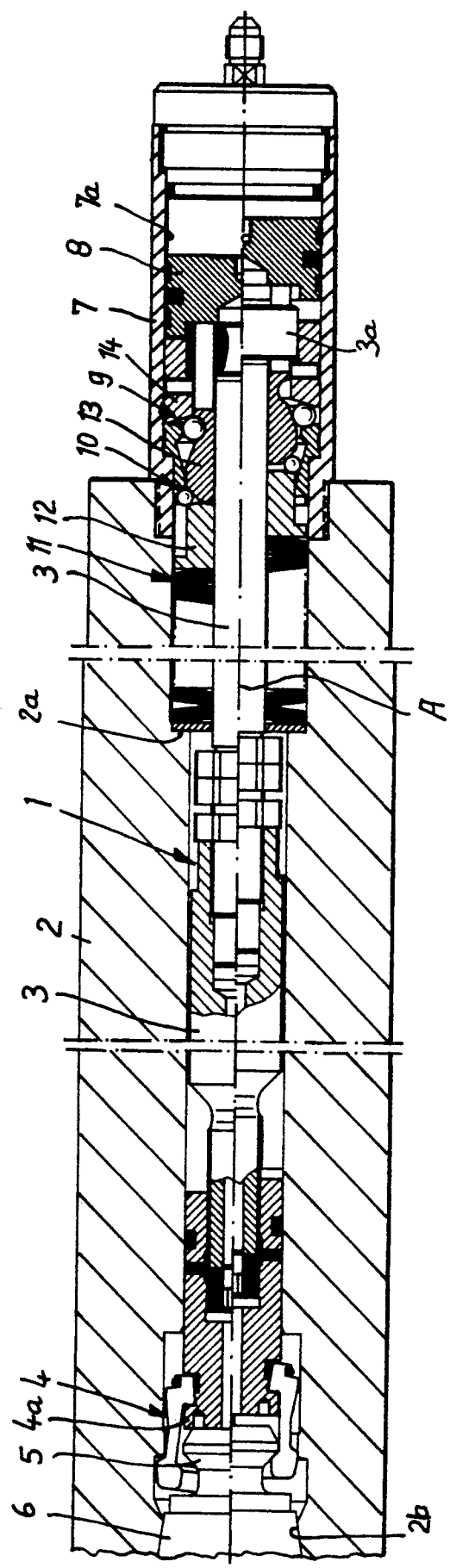

The actuating arrangement for a tool clamping device (1) has a clamping bar (3) which is axially displaceable in a clamping direction in a machine tool spindle (2) under the effect of a spring arrangement (11) and a firsst wedge transmission assembly (9) which is operable between the spindle and the clamping bar, with freely movable balls which bear respectively against three cone surfaces. They are disposed on a clamping sleeve (13) which is axially displaceable on the clamping bar, on a clamping ring (14) connected to the clamping bar (3), and on a support ring (15) which is arranged stationarily with respect to the spindle. The spring arrangement (11) acts by way of a pressure sleeve (12) which is axially displaceable on the clamping bar. Disposed between the pressure sleeve (12) and the clamping sleeve (13) is a second wedge transmission assembly (10) with freely movable balls which respectively bear against two cone surfaces which are inclined in mutually opposite relationship on the mutually facing ends of the two sleeves (12, 13) and successively against two further cone surfaces which are inclined in opposite relationship on the support ring (15). In the release stroke movement in opposite relationship to the clamping direction a piston-cylinder unit (7, 8) initially acts on the clamping sleeve (13) and then also on an annular shoulder (3a) of the clamping bar (FIG. 1).

6 Claims, 4 Drawing Sheets

ACTUATING ARRANGEMENT FOR A TOOL OR WORKPIECE CLAMPING DEVICE IN A MACHINE TOOL SPINDLE

The invention relates to an actuating arrangement for a tool or workpiece clamping device in a machine tool spindle, comprising a clamping bar which is axially displaceable in the clamping direction in the spindle under the force of a spring arrangement, and a first wedge transmission assembly which is operative between the spindle and the clamping bar, with freely movable balls which respectively bear against three cone surfaces of which one cone surface is provided on a clamping sleeve which is axially displaceable on the clamping bar, the other cone surface is provided on a clamping ring connected to the clamping bar and the third cone surface is provided on a support ring arranged stationarily with respect to the spindle, further comprising a pressure sleeve which is axially displaceable on the clamping bar between the spring arrangement and the clamping sleeve and which acts on the clamping sleeve in the clamping direction, and a piston-cylinder unit whose piston firstly acts on the clamping sleeve in a first phase of its release stroke movement which is directed oppositely to the clamping direction and also acts on an annular shoulder on the clamping bar in a second phase.

In a known actuating arrangement of that kind (see the prospectus from the company A. Ott, Kempten "Mit Prazision zum Erfolg, Ott-Werkzeugspanner", 1986 edition, page 3), the wedge transmission assembly serves in the clamping operation to increase the force which acts on the clamping bar from the spring arrangement in order thereby to enhance the pulling-in force (clamping force) of the tool or workpiece clamping arrangement. In addition the wedge transmission assembly also serves to lock the clamping bar relative to the spindle in the clamped condition, so that in the event of failure of the spring arrangement, for example due to the spring breaking, or in the event of elevated pulling-out forces acting on the tool or the workpiece in opposite relationship to the clamping direction, the component which is clamped by the clamping arrangement is securely held in position. In that known actuating arrangement the piston-cylinder unit serves not only for stressing the spring arrangement and for opening the collet disposed at the front end of the clamping bar, but also for ejecting the tool from the spindle. As a large part of the force applied by the piston-cylinder unit is used for stressing the spring arrangement, only a part of that force is available for ejection of the tool. In the case of tools with a steep-angle taper, there is now the problem that, at high spindle speeds of rotation, the receiving cone or taper portion of the spindle expands and the tool is drawn further into the receiving cone or taper portion, under the effect of the spring arrangement. Therefore, the tool ejection operation involves overcoming a shrink-type fit. In addition at high spindle speeds of rotation the balls are urged under the effect of centrifugal force into the wedge-shaped annular gap between the cone surfaces of the support ring and the clamping ring, with the result that the clamping force is unintentionally increased. A higher ejection force is then also required in order to eject the tool. In order to produce that higher ejection force, the arrangement requires a piston-cylinder unit which is of correspondingly large dimensions and/or a high operating pressure for that purpose. If there is a wish to increase the tool or workpiece clamping force, that can only be achieved by increasing the size of the spring arrangement which in turn makes it necessary to increase the size of the piston-cylinder unit or the magnitude of the operating pressure.

The invention is therefore based on the problem of providing an actuating arrangement for a tool or workpiece clamping device of the kind set forth in the opening part of this specification, which has an elevated ejection and pulling-in force without involving an increase in the structural dimensions thereof.

In accordance with the invention that is achieved in that provided between the pressure sleeve and the clamping sleeve is a second wedge transmission assembly with freely movable balls which respectively bear against two cone surfaces which are inclined in mutually opposite relationship at the mutually facing ends of the two sleeves and successively against two further cone surfaces which are inclined in mutually opposite relationship on a ring arranged concentrically with respect to the sleeves stationarily relative to the spindle, wherein the first cone surface which faces towards the spring arrangement expands in a conical configuration towards the spring arrangement and the second cone surface which is towards the clamping sleeve expands in a conical configuration towards the clamping ring, in such a way that at the beginning of the clamping stroke movement of the pressure sleeve, which is produced by the spring arrangement, the balls of the second wedge transmission assembly bear against the first cone surface and act on the clamping sleeve to produce a travel step-up effect, and in a second phase of the clamping stroke movement they bear against the second cone surface and thereby in the second phase of the clamping stroke movement act on the clamping sleeve to produce a force-increasing effect and in the last phase of the release stroke movement which is produced by the piston-cylinder unit and which is directed in opposite relationship they again bear against the first cone surface and thereby act on the pressure sleeve towards the spring arrangement, to produce a force-increasing effect.

During the second phase of the clamping stroke movement the spring force is increased on a first occasion by the second wedge transmission assembly, by the balls thereof pressing against the clamping sleeve. The clamping sleeve in turn presses the balls of the first wedge transmission assembly between the cone surfaces on the clamping ring and on the support ring, thereby providing a second force step-up effect. That causes the spring force to be stepped up twice and the clamping bar pulls the tool or workpiece into the spindle with an increased force. In the release stroke movement of the piston the balls pass again into the region of the first cone surface of the second wedge transmission assembly whereby there is an increase in the piston force in a direction towards the spring arrangement. By virtue of that consideration, only a small portion of the piston force is required to prestress the spring pack the last tenths of a millimetre. Due to the low level of force required to produce the spring prestressing effect, more piston force remains available for ejection of the tool. A further advantage of the new actuating arrangement is that it does not require any additional space, in comparison with the known actuating arrangement. Consequently it is also possible to convert already existing actuating arrangements with parts of the new actuating arrangement in order in that way to provide for an increased ejection and clamping force, even in already existing actuating arrangements.

Advantageous embodiments of the invention are characterised in the subsidiary claims.

Figure 2:
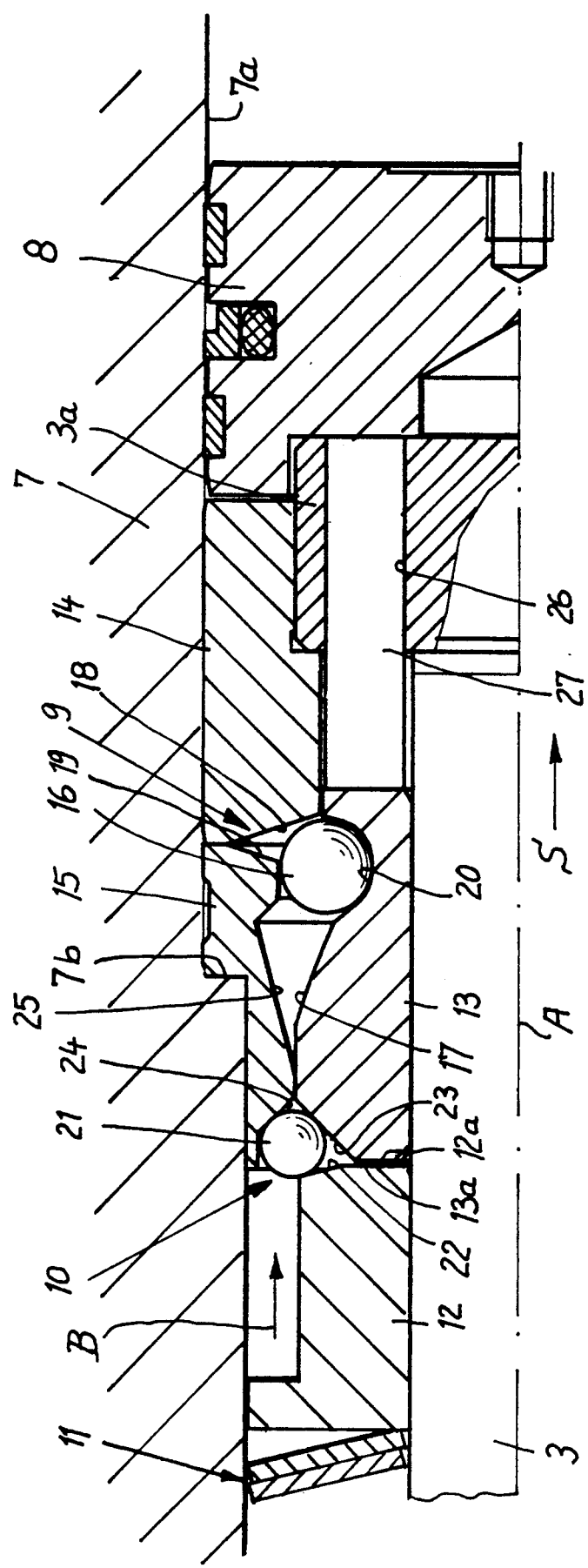
Figure 3:
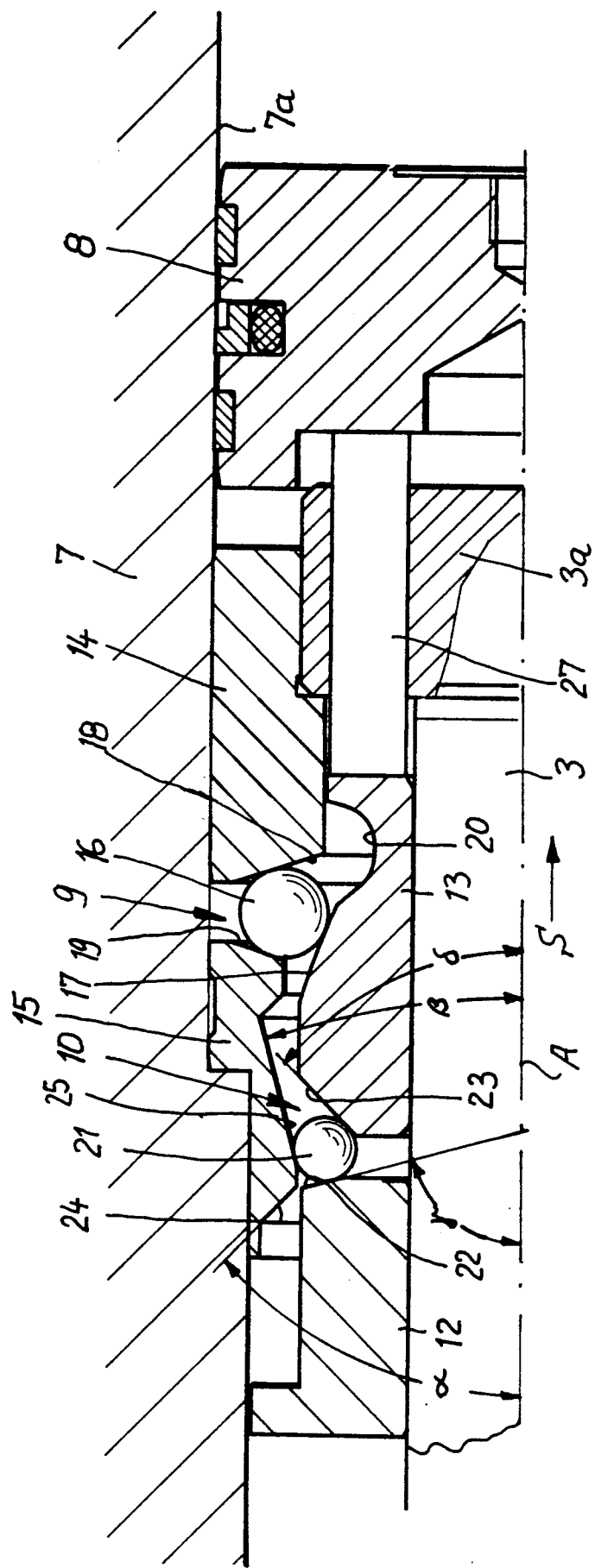
Figure 4:
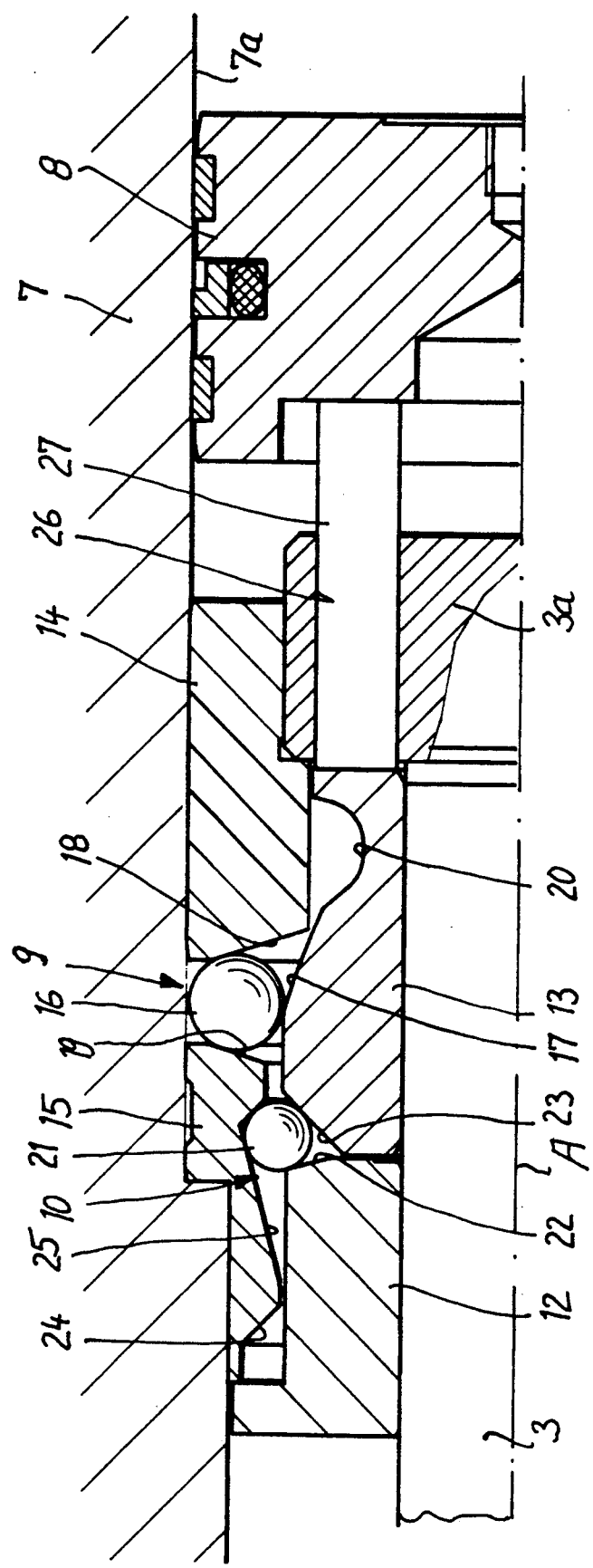

The invention is described in greater detail hereinafter with reference to an embodiment illustrated in the drawing in which:

FIG. 1 is a view in longitudinal section of a complete tool clamping device,

FIG. 2 is a view in longitudinal section of part of the actuating arrangement in the starting phase of the clamping stroke movement or the terminal phase of the release stroke movement, FIG. 3 is a view in longitudinal section of part of the actuating arrangement in an intermediate position, and FIG. 4 is a view in longitudinal section of part of the actuating arrangement in the terminal position of the clamping stroke movement or the starting postion of the release stroke movement.

Shown in FIG. 1 is a complete tool clamping device 1 which is fitted into a machine tool spindle 2. The tool clamping device is shown in its release position in the upper half of FIG. 1 and in its clamping position in the lower half in FIG. 1. The clamping bar 3 is axially displaceable in the direction of its axis A relative to the spindle 2 and at its end towards the tool carries a collet 4 which for example engages the draw-in post portion 5 of a tool with a steep-angle taper shank 6. The arrangement also includes a cylinder housing 7 which can be fixedly screwed into the spindle 2 and which contains a hydraulic piston-cylinder unit with a piston 8 slidable in a cylinder 7a. Also arranged in the cylinder housing 7 are a first wedge transmission assembly 9 and a second wedge transmission assembly 10, the structure and mode of operation of which will be described in greater detail hereinafter with reference to FIGS. 2 to 4. The clamping bar 3 is also surrounded by a spring arrangement 11 comprising a plurality of plate springs. The spring arrangement 11 is supported at one end against a shoulder 2a on the spindle 2 and on the other end against a pressure sleeve 12 which is axially displaceable on the clamping bar 3.

The first wedge transmission assembly 9 includes a clamping sleeve 13 which is axially displaceable on the clamping bar 3, a clamping ring 14 which is fixedly connected to the clamping bar 3 by way of the annular shoulder 3a thereof, a support ring 15 which is supported against an annular shoulder 7b and which is fixedly fitted into the cylinder housing 7 and a plurality of freely movable balls 16 which respectively bear against three cone surfaces 17, 18 and 19. The one cone surface 17 is provided on the clamping sleeve 13, the other cone surface 18 is provided on the clamping ring 14 and the third cone surface 19 is provided on the support ring 15. The clamping sleeve 13 also has a parking groove 20 for the balls 16. The second wedge transmission assembly 10 which is disposed between the pressure ring 12 and the clamping sleeve 13 also has a plurality of freely movable balls 21 which bear against a cone surface 22 on the pressure ring, a cone surface 23 on the clamping sleeve 13 and successively against a first cone surface 24 and a second cone surface 25. The cone surfaces 24 and 25 are advantageously provided on the support ring 15 in a region thereof which is between the third cone surface 19 and the spring arrangement 11. The two cone surfaces 24 and 25 could possibly also be arranged on a separate ring which is disposed in a stationary condition in the spindle housing 7. The first cone surface 24 and the second cone surface 25 are inclined in mutually opposite relationship, with the first cone surface 24 expanding in a conical or tapered configuration towards the spring arrangement 11 while the second cone surface which faces towards the clamping sleeve 13 expands in a conical or tapered configuration towards the clamping ring 14. The cone surfaces 23 and 24 which are provided at the end faces 12a and 13a of the pressure sleeve 12 and the clamping sleeve 13 respectively are also inclined in mutually opposite relationship. The annular shoulder 3a on the clamping bar 3 also has a plurality of axial bores 26 in which pressure pins 27 are slidable, the pressure pins 27 bearing at one end against the piston 8 and at the other end against the clamping sleeve 13.

At the beginning of the clamping stroke movement the parts of the actuating arrangement occupy the position shown in FIG. 2. The collet 4 is opened, as shown in the upper part of FIG. 1. When now the pressure obtaining in the cylinder 7a is removed, the spring arrangement 11 then pushes the pressure sleeve 12 towards the right in the direction indicated at B. Under the effect of their cone surface 22, the balls 21 are moved radially inwardly at the first cone surface 24 of the support ring 15. The balls 21 press against the cone surface 23 of the clamping sleeve 13. In that first phase of the clamping stroke movement of the pressure sleeve 12, there is a travel step-up effect, that is to say the clamping sleeve 13 moves towards the right by a greater distance than the pressure sleeve 12. Upon the movement of the clamping sleeve 13 towards the right, the balls 16 come to bear against the cone surface 18 of the clamping ring 14 and also urge the latter towards the right. The clamping bar 3 is urged towards the right in the clamping direction S by the clamping ring 14, whereby the collet 4 closes and initially draws the tool into the receiving cone portion 2b of the spindle 2 by means of the draw-in post 5, with a low level of force.

After the balls 21 have passed the radially narrowest point of the support ring 15, they now bear against the second cone surface 25 of the support ring 15, as shown in FIG. 3. As the second cone surface 25 is inclined in opposite relationship to the first cone surface 24, there is now a force step-up effect. The spring arrangement 11 urges the balls 21 into the taperingly decreasing annular gap between the cone surfaces 23 and 25 and the axial force stored in the spring arrangement is transmitted to the clamping sleeve 13 with a force step-up effect. The clamping sleeve 13 now urges the balls 16, with its cone surface 17, into the taperingly decreasing annular gap between the cone surfaces 18 and 19, thereby producing a second force step-up effect. The balls 16 which bear against the clamping ring 14 now urge the clamping ring 14 and therewith the clamping bar 3 fixedly connected thereto towards the right in the clamping direction S with a high level of force and the tool is now pulled into the receiving cone portion 2b with a high pull-in force which is substantially higher than the axial force produced by the spring arrangement. As the clamping sleeve 13 is displaced on the clamping bar 3 during the clamping stroke movement, the piston 8 is displaced towards the right by the pressure pins 27 and in doing so moves away from the annular shoulder 3a. At the end of the clamping stroke movement the parts of the actuating arrangement occupy the position shown in FIG. 4.

That position is at the same time the starting position for the release stroke movement. If the tool is to be released and ejected from the spindle 2, pressure is applied to the cylinder 7a. By way of the pressure pins 27 the piston 8 displaces the clamping sleeve 13 towards the left, in the opposite direction to the clamping direction S. Its cone surface 23 presses against the balls 21 which in turn press the pressure sleeve 12 towards the left. As the second cone surface 25 against which the balls 21 bear constricts radially inwardly in that movement towards the left, during the first phase of the release stroke movement there is a travel step-up effect between the clamping sleeve 13 and the pressure sleeve 12, that is to say in this first phase of the release stroke movement the pressure sleeve 12 moves towards the left by a greater travel distance than the clamping sleeve 13. The spring arrangement 11 is prestressed by the pressure sleeve 12. During the first phase of the release stroke movement the piston 8 also comes to bear against the annular shoulder 3a on the clamping bar 3. The clamping sleeve 13 is displaced towards the left during the first phase of the release stroke movement to such an extent that the balls 16 pass into the parking groove 20. As soon as the piston 8 bears against the annular shoulder 3a, the clamping bar 3 is further displaced towards the left, together with the clamping ring 14 and the clamping sleeve 13, until the collet 4 releases the draw-in post 5 and the collet holder 4a presses against the draw-in post 5, as shown in the upper part of FIG. 1. Just before the holder 4a comes into contact with the draw-in post 5, the balls 21 have passed the narrowest part of the support ring 15 and they now bear against the first cone surface 24. The cone surface 23 of the clamping sleeve 13 now pushes the balls 21 into the wedge-shaped annular gap between the cone surfaces 22 and 24, thereby providing for an increase in the force produced by the piston 8, with the pressure sleeve 12 now being urged further towards the left under the effect of that increase in force. In order to prestress the spring arrangement 11 the last tenths of a millimetre, the increase in the force means that a lower force is required for urging the clamping sleeve 13 towards the left. As a result of that lower requirement for force for prestressing the spring arrangement 11, a larger part of the piston force remains available for ejection of the tool. That operation of ejecting the tool takes place during the last phase of the release stroke movement of the piston 8, when the holder 4a presses against the draw-in post 5.

The angle of inclination α of the first cone surface 24 relative to the axis A of the clamping bar may be 15° to 75° and should preferably be about 45°. The angle of inclination β of the second cone surface 25 relative to the axis A of the clamping bar can be 10° to 30° and should preferably be about 20°. The angle of inclination γ of the cone surface 22 on the pressure sleeve 13, relative to the axis A of the clamping bar, can be in the range between 45° and 90° and should preferably be about 75°. The angle of inclination δ of the cone surface on the clamping sleeve 13, of the second wedge transmission assembly 10, relative to the axis A of the clamping bar, should be between 15° and 75° and should preferably be about 45°.

We claim:

1. An actuating arrangement for a tool or workpiece clamping device in a machine tool spindle, comprising a clamping bar which is axially displaceable in the clamping direction of the spindle under the force of a spring arrangement, and a first wedge transmission assembly which is operative between the spindle and the clamping bar, with freely movable balls which respectively bear against three cone surfaces of which one cone surface is provided on a clamping sleeve which is axially displaceable on the clamping bar, the other cone surface is provided on a clamping ring connected to the clamping bar and the third cone surface is provided on a support ring arranged stationarily with respect to the spindle, further comprising a pressure sleeve which is axially displaceable on the clamping bar between the spring arrangement and the clamping sleeve and which acts on the clamping sleeve in the clamping direction, and a piston-cylinder unit whose piston firstly acts on the clamping sleeve in a first phase of its release stroke movement which is directed oppositely to the clamping direction and also acts on an annular shoulder on the clamping bar in a second phase, characterised in that provided between the pressure sleeve (12) and the clamping sleeve (13) is a second wedge transmission assembly (10) with freely movable balls (21) which respectively bear against two cone surfaces (22, 23) which are inclined in mutually opposite relationship at the mutually facing ends (12a, 13a) of the two sleeves (12, 13) and successively against two further cone surfaces (24, 25) which are inclined in mutually opposite relationship on a ring (15) arranged concentrically with respect to the sleeves (12, 13) stationarily relative to the spindle (2), wherein the first cone surface (24) which faces towards the spring arrangement (11) expands in a conical configuration towards the spring arrangement (11) and the second cone surface (25) which is towards the clamping sleeve (13) expands in a conical configuration towards the clamping ring (14), in such a way that at the beginning of the clamping stroke movement of the pressure sleeve (12), which is produced by the spring arrangement (11), the balls (21) of the second wedge transmission assembly (10) bear against the first cone surface (24) and act on the clamping sleeve (13) to produce a travel step-up effect, and in second phase of the clamping stroke movement they bear against the second cone surface (25) and thereby in the second phase of the clamping stroke movement act on the clamping sleeve (13) to produce a force-increasing effect and in the last phase of the release stroke movement which is produced by the piston-cylinder unit (7a, 8) and which is directed in opposite relationship they again bear against the first cone surface (24) and thereby act on the pressure sleeve (12) towards the spring arrangement (11), to produce a force-increasing effect.

2. An actuating arrangement according to claim 1 characterised in that the first and second cone surfaces (24, 25) of the second wedge transmission assembly (10) on the support ring (15) are provided in a region thereof which is between the third cone surface (19) and the spring arrangement (11).

3. An actuating arrangement according to claim 1 characterised in that the angle of inclination (α) of the first cone surface (24) with respect to the axis (A) of the clamping bar is 15° to 75°, preferably about 45°.

4. An actuating arrangement according to claim 1 characterised in that the angle of inclination (β) of the second cone surface (24) with respect to the axis (A) of the clamping bar is 10° to 30°, preferably about 20°.

5. An actuating arrangement according to claim 1 characterised in that the angle of inclination (γ) of the cone surface (22) provided on the pressure sleeve (12)

with respect to the axis (A) of the clamping bar is 45° to 90°, preferably about 75°.

6. An actuating arrangement according to claim 1 characterised in that the angle of inclination (δ) of the cone surface (23) provided on the clamping sleeve (13) of the second wedge transmission assembly (10) with respect to the axis (A) of the clamping bar is 15° to 75°, preferably about 45°.

* * * * *